United States Patent
I'Anson

(10) Patent No.: US 7,027,652 B1
(45) Date of Patent: Apr. 11, 2006

(54) INFORMATION CAPTURE AND PROCESSING

(75) Inventor: Colin I'Anson, Bristol (GB)

(73) Assignee: Hewlett-Packard Company, Fort Collins, CO (US)

( * ) Notice: Subject to any disclaimer, the term of this patent is extended or adjusted under 35 U.S.C. 154(b) by 992 days.

(21) Appl. No.: 09/715,560

(22) Filed: Nov. 17, 2000

(30) Foreign Application Priority Data

Nov. 18, 1999 (GB) .................................... 9927349

(51) Int. Cl.
*G06K 9/68* (2006.01)

(52) U.S. Cl. ...................................... 382/218; 382/305

(58) Field of Classification Search ................ 382/217, 382/218, 305, 306; 358/403; 707/1, 6; 715/507, 715/508, 512–517
See application file for complete search history.

(56) References Cited

U.S. PATENT DOCUMENTS

| 4,943,868 | A | 7/1990 | Yoshinaga et al. ........... 358/403 |
| 5,278,673 | A | 1/1994 | Scapa et al. ................. 358/473 |
| 5,404,294 | A | 4/1995 | Karnick .................... 364/419.1 |
| 5,675,358 | A | 10/1997 | Bullock et al. .............. 345/115 |
| 6,272,484 | B1 * | 8/2001 | Martin et al. ................... 707/1 |
| 6,427,032 | B1 * | 7/2002 | Irons et al. ................. 382/306 |
| 6,546,405 | B1 * | 4/2003 | Gupta et al. ................. 715/512 |
| 6,562,077 | B1 * | 5/2003 | Bobrow et al. .............. 715/517 |

OTHER PUBLICATIONS

Joel T. Patz, "OmniForm in Perfect Form", May 1998, http://www.winmag.com/library/1998/0501/rev0090.htm, (visited Mar. 6, 2001).
Henry Norr, "Review/ OmniForm 2.0", Jun. 1997, http://www.macuser.zdnet.com/mu_069//reviews/omni.html, (visited Mar. 6, 2001).
J. C. Cowen, "Search Report under Section 17", European Patent Office, Mar. 8, 2001.

* cited by examiner

*Primary Examiner*—Yon J. Couso

(57) ABSTRACT

A computer system comprises an image capture device (10) for capturing an image of a paper document (such as a newspaper article or advertisement) to produce captured image information, and keys or the like for enabling a user to select one of a plurality of options (such as "view" or "order") in relation to that capture information. The system also includes a document database (36) storing image information relating to the contents of a plurality of documents and, for each document, information relating to action which can be taken in relation to that document, and a processor system (30,36) for matching the captured image information with the stored image information for at least one of the documents and determining the respective action information, and for processing the determined action information and the user-selected option to produce a computer instruction as to action to be taken (such as load the newspaper article into the PC's web browser, or "electronically" order the product).

16 Claims, 2 Drawing Sheets

INFORMATION CAPTURE AND PROCESSING

FIELD OF THE INVENTION

This invention relates to computer systems and is more particularly concerned with information capture and processing.

BACKGROUND OF THE INVENTION

The internet has become a popular way for many people to amass information and to trade. Much of the information on the internet is accessible to anybody at any time of day, and ordering products and services through the internet can be performed at any time of day. Most such people do, however, still read paper publications and may want to follow up something which they have seen on paper, for example obtain more information about a product advertised in a magazine, or send copies of an article in a business journal to their colleagues. This can be done using the internet, but there are two problems. First, the person needs to remember to do it at a time when they have the facility to do it. Second, they need to find the relevant information on the internet. The present invention is concerned with tackling these problems.

SUMMARY OF THE INVENTION

In accordance with a first aspect of the present invention, there is provided a computer system comprising: capturing means for capturing an image of a paper document to produce captured image information; selecting means for enabling a user to select one of a plurality of options in relation to that captured image information; a document database storing image information relating to a plurality of documents and for each document information relating to action which can be taken in relation to that document; and processing means for matching the captured image information with the stored image information for at least one of the documents and determining the respective action information, and for processing the determined action information and the user-selected option to produce a computer instruction as to action to be taken. (In this specification, the term "paper document" is intended to have a wide meaning and to include loose paper, a magazine, a book, a poster, etc.)

The user can therefore capture the required information at the time of reading the document, and the system then, perhaps at a later convenient time, establishes a link between the captured information and corresponding "electronic" information. Examples of types of article or advertisement, the respective action information which might be stored by the document database, the respective valid selectable options, and the respective computer instructions are as follows:

| Type | Action Information | Option | Computer Instruction |
|---|---|---|---|
| Newspaper article | URL of newspaper article, search terms | View | Browse URL |
| | | Similar | Normal search request using search terms |
| | | Follow-up | Ongoing search request using search terms |
| Product advertisement | URL of advertisement, URL of product specification, URL of supplier's order form, cost. | View | Browse URL of advertisement |
| | | Follow-up | Browse URL of product specification |
| | | Order | Send order to URL of supplier's order form |
| Book review | URL of book review, URL of supplier's order form, cost | View | Browse URL of book review |
| | | Order | Send order to URL of supplier's order form |
| Business journal article | URL of journal article, search terms, cost | View | Browse URL of journal article |
| | | Follow-up | Ongoing search request using search terms |
| | | Re-print | E-mail to specified addresses |

Preferably, the captured image information includes information from which textual and/or graphical content of the captured document can be determined and/or information from which font and/or layout and/or colour in the captured document can be determined and/or information from which a property of the paper of the captured document can be determined; and the processing means uses such information in the matching process.

Preferably, a user database is provided storing information about a plurality of users; and the processing means is operable to receive the stored information for the particular user and to use that information in producing the computer instruction. For example, when a product order is made, the instruction may include the shipping address and details of the bank account to be charged.

It is, of course, possible that the captured image information does not match the stored image information for any of the documents. In this case, however, the processing means is preferably operable to analyse the captured image information to determine whether it relates to a form (such as an enquiry form or an order form), and, if so: to determine at least one position where user information should be added to the form to complete the form; and to add the user information for the particular user to the captured image information to provide an image of the form completed with the user information in the determined position(s). The completed form can, for example, then be printed out and mailed to the advertiser or supplier, or faxed to them, or it can be transmitted completely electronically. (In this specification, the term "form" is intended to have a wide meaning and to include any suitable means of expressing intent.)

It will be appreciated that this latter feature may be provided independently of the first aspect of the invention. Therefore, in accordance with a second aspect of the invention, there is provided a computer system comprising: capturing means for capturing an image of a paper form to produce captured image information; a user database storing information about a plurality of users; processing means for analysing the captured image information to determine at least one position where user information should be added to the form to complete the form, for selecting the stored user information for one of the users and for adding the selected user information to the captured image information to provide an image of the form completed with the user information in the determined position(s).

With either of these aspects of the invention, the system preferably further comprises means for storing the captured image information (and if applicable the user selected option), more preferably for a plurality of images, for subsequent supply to the processing means. Processing can therefore be deferred until a convenient time.

In accordance with third and fourth aspects of the present invention, there are provided corresponding methods of operation of a computer system.

BRIEF DESCRIPTION OF THE DRAWINGS

A specific embodiment of the present invention will now be described, purely by way of example, with reference to the accompanying drawing, in which.

BEST MODE OF CARRYING OUT THE INVENTION

Figure 1:
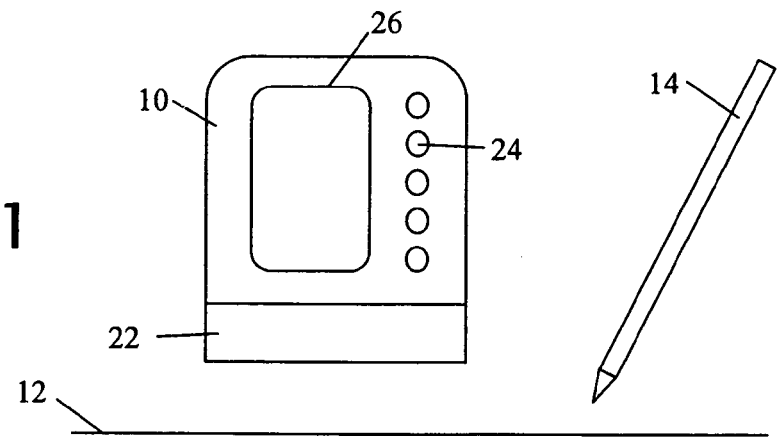
FIG. 1 shows an image capture device, document and writing implement.
Figure 2:
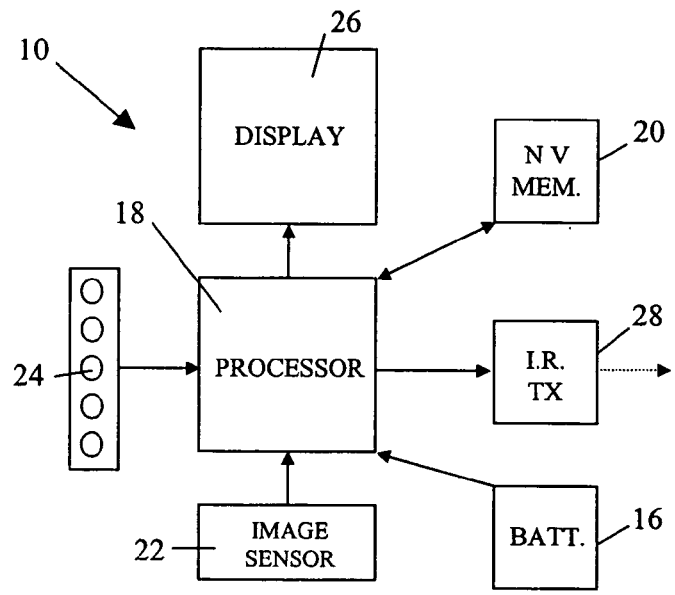
FIG. 2 is a schematic block diagram of the image capture device of FIG. 1.

Referring to FIGS. 1 and 2, in the embodiment of the invention, the hardware of an image capture device 10 is provided by a CapShare (trade mark) e-copier, for example model 920, produced by Hewlett-Packard Company, and this known hardware is configured to operate in a new manner.

The image capture device 10 is a battery-powered, pocket-sized, hand-held device which can moved (or "swiped") across a paper document 12 to read information from it. This information may be pre-printed matter and/or information which has been written on the document 12 by a user with a pen or pencil 14. The information may include text, line-art, graphics, barcodes, etc. In the preferred embodiment, the read information is sufficient to enable physical properties (such as fibre size and pattern) of the paper of the document 12 to be determined, together with layout, fonts and colours of the printed matter.

Referring in particular to FIG. 2, the image capture device 10 is powered by batteries 16 and comprises a processor 18 and associated volatile and non-volatile memory 20. An image sensor 22 captures the information provided by the document 12 as the device 10 is swiped across the document 12, processes the captured information and stores the processed information in the memory 20. A number of user-operable keys 24 are provided to enable the user to control the device 10 and enter additional information. A liquid crystal display 26 is provided to display messages to the user and also the captured image. The device 10 also includes an infra-red transmitter 28 which can be used to transmit the stored information to a co-operating computer, such as a PC, or printer. The features of the device 10 described in this paragraph and the previous paragraph are standard features of the CapShare device and are described in more detail in the product and patent literature.

Figure 3:
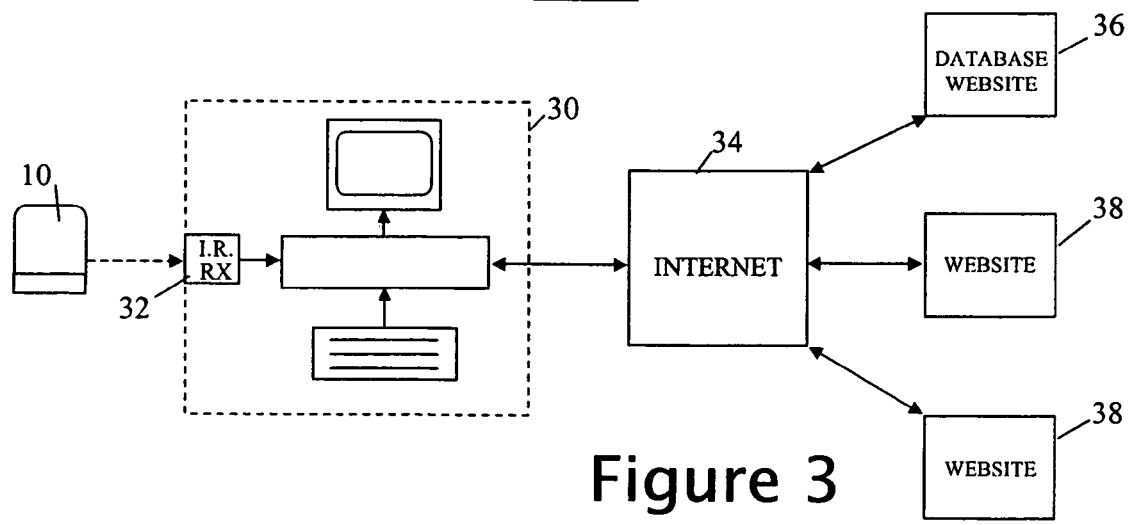
FIG. 3 is a schematic block diagram of a system including the image capture device of FIG. 1, a user's computer, the internet and a number of internet web sites.

In the embodiment of the invention, the image capture device 10 described above with reference to FIGS. 1 and 2 is used in a system which will now be described also with reference to FIG. 3. In FIG. 3, the image capture device 10 is shown, together with the user's PC 30 which has an infra-red receiver 32 which can communicate with the infrared transmitter 28 of the image capture device 10. The PC 30 is connected, or connectable, to the internet 34 in a conventional fashion, and the internet 34 includes a database web-site 36.

At the time of information capture, the image capture device 10 is configured to present the user, via the display 26, with options for action to be taken in relation to the information. The user then selects a desired option or options (hereinafter referred to as "option" for simplicity) using the keys 24, and the selected option for that information is stored in the memory 20. At a later convenient time, the information which has been captured, processed and stored in the device 10 is transmitted, together with the selected action, to the PC 30 via the infra-red transmitter 28 and receiver 32. The PC 30, database web-site 36, other web-sites 38 and the user then interact in order to bring about the action which was selected by the user at the time of capture in relation to the information which was captured.

The database web-site 36 has a user database which includes details of each user of the system, such as their name, e-mail address, shipping address, bank and/or credit card account (hereinafter "bank account") and a list of publications in which the user has registered an interest. Also, as the user participates in the system, it builds up, in the user database, a profile of that user.

The database web-site 36 also has a publications database. For publications such as magazines and newspapers which are provided in paper and electronic form, the publications database includes, for each publication, the properties of the paper (such as fibre size and pattern) on which the paper form is usually published, and the colour and font normally used. Also, for each article or advertisement in such a publication, the publications database includes the electronic form of that article or advertisement. Furthermore, for each article, advertisement or other material, the publications database includes respective action information. This may include, for example:

An abstract of that article or advertisement.

In the case of a news article, the URL of an electronic copy of that article, search terms to enable a normal search or a follow-up search to be performed, and cost data for the follow-up search service.

In the case of, say, a book or theatrical review, the URLs of the review and of a supplier of the book or the theatre box office, cost information, and a list of parameters required in order to purchase the book or theatre tickets.

In the case of an advertisement for a product; the URLs of the advertisement, of a corresponding product specification, and of the supplier of that product, cost information, and a list of parameters required in order to purchase the product;

Returning to the time of image capture, examples of the options which the user may be able to select, and examples of the ways in which the user might use these options are:

"View". For example, the user might see an advertisement for a conference that may be of interest. The user swipes the image capture device 10 across the advertisement 12 and then presses one of the keys 24 designated "View". The intention is that an electronic form of the advertisement will automatically be called up later on the web browser of the user's PC 30 so that the user is reminded about the conference and can consider further whether to attend it.

"Re-print". For example, the user reads an article which they wish a number of their colleagues to see. Mindful of potential copyright infringement issues if the user were to copy the article, the user swipes the image capture device 10 across part of the article 12 sufficient for the article to be identifiable and then presses one of the keys 24 designated "Re-print". The intention is that the user will automatically be reminded later by the user's PC 30 of the article and prompted for a list of the e-mail addresses of the colleagues to which an electronic form of the article should be sent. This electronic form of the article is then sent to those e-mail addresses, either from the database web-site 36, or in response to an instruction from the database web-site 36 to another web-site 38. A pre-arranged fee can be charged, for example on a per copy basis, to the user's bank account as detailed in the user database, and the income can be distributed in a predetermined manner between the proprietors of the database web-site 36 and the publishers of the article.

"Order". For example, the user reads an advertisement in a magazine for a product which they wish to purchase. The user swipes the image capture device 10 across the advertisement 12 and then presses one of the keys 24 designated "Order". The intention is that the user will automatically be reminded later by the user's PC 30 of the potential order and prompted to confirm/amend it. The prompt may be accompanied at that stage by a prompt for further particulars, such as the number of the products to be supplied and/or special requirements. Alternatively, the paper form of the advertisement may include portions for the user to complete, such a tick boxes, with the intention that, prior to image capture, the user completes these portions using the pen or pencil 14. These markings are interpreted by the database web-site so as to particularise the order automatically prior to the confirmation/amendment prompt. Once the order has been confirmed, subject to any desired amendment, the order is transmitted to the web-site of the supplier of the product, together with details of the user including the shipping address and bank account. The supplier can then fulfil the order and obtain payment, and the income can be distributed in a predetermined manner between the proprietors of the database web-site 36, the suppliers of the product and the publishers of the magazine from which the advertisement was captured.

As another example of the "Order" option, the user reads a review of a book and decides that they may wish to purchase the book. The user swipes the image capture device 10 across the book review 12 and then presses that one of the keys 24 designated "Order". The intention is that the user will automatically be reminded later by the user's PC 30 of the potential order and prompted to confirm/amend it. Again, the prompt may be accompanied at this stage by a prompt for further particulars, such as the number of the books to be supplied and/or special requirements, such as a hardback or paperback copy. Once the order has been confirmed, subject to any desired amendment, the order is transmitted to the web-site of the supplier of the book, together with details of the user including the shipping address and bank account. The supplier can then fulfil the order and obtain payment, and the income can be distributed in a predetermined manner between the proprietors of the database web-site 36, the suppliers of the book and the publishers of the book review.

"Follow-up". For example, the user might read a new-breaking article in a newspaper on a topic of which they wish to be kept appraised. The user swipes the image capture device 10 across part of the article 12 sufficient for the article to be identified and then presses one of the keys 24 designated "Follow-up". The intention is that the user will automatically be reminded later by the user's PC 30 of the potential follow-up order and prompted to confirm/amend it. The prompt may be accompanied at this stage by a prompt for further particulars, such as the period of time over which the user is to be kept appraised, and whether the appraisal is to be confined to further articles on that topic in the same newspaper or is to include other sources. Once the order has been confirmed, subject to any desired amendment, it is logged in the database web-site 36. Then, as further publications are added to the database web-site 36, they are searched to determine whether any articles in them fall within the scope of the follow-up order. If so, those articles are e-mailed to the user. A pre-arranged fee can be charged, for example on a per order basis and/or on a per result basis, to the user's bank account as detailed in the user database, and the income can be distributed in a predetermined manner between the proprietors of the database web-site 36, the publishers of the original newspaper and any other publishers who provide a result.

"Similar". For example, the user reads a sports report of the latest Formula 1 grand prix motor race and wishes to give their child a picture of the winning driver. The user swipes the image capture device 10 across the sports report 12 and then presses one of the keys 24 designated "Similar". The intention is that a web search will automatically be performed later, on the basis of the captured sports report, and the results of the search will be displayed in a conventional manner on the web browser of the user's PC 30 as a list of web pages and abstracts of them. The user can then select a web page which may link to an electronic copy of the required picture or a web page through which a paper poster of the required picture can be ordered on-line. A pre-arranged fee can be charged for this service, for example on a per search basis and/or on a per picture download basis and/or on a poster-ordered basis, to the user's bank account as detailed in the user database, and the income can be distributed in a predetermined manner between the proprietors of the database web-site 36, the publishers of the original sports report and the providers of the electronic picture or paper poster. In order to provide the functions described above, the system shown in the drawings operates as follows. First, at the image capture stage:

At the time of image capture, the information on the document 12 is read by the image sensor 22, is stitched together by the processor 18 and is stored in the memory 20, all in a known manner. The information may be processed by the processor 18 to OCR any text, vectorise any line art, compress any graphics and decode any bar-codes. (Such processing may, however, be done at a later stage, for example by the user's PC 30 or by the database web-site 34.) The stored information is sufficient to enable the layout, fonts and colours of the printed or written matter and the fibre size and pattern of the paper of the document 12 to be determined.

Immediately after image capture, the user is presented with the options View, Re-print, Order, Follow-up and Similar. The user selects one of the options by pressing an appropriate one of the keys 24, and the selected option is stored in the memory 20.

The image capture device is then made ready to capture a further image.

Then, during a docking stage at a later convenient time, when the user places the image capture device 10 in the vicinity of the PC 30:

The user presses one of the keys 24 to instigate transfer of the information. The information stored in the memory of the image capture device 10 is transmitted via the infra-red transmitter 28 and receiver 32 to the PC 30.

The web-browser application of the PC 30 is then started, and the PC 30 is logged into the database web-site 36 on the internet 34.

Then, for each set of image capture information received by the PC 30, the PC 30, database web-site 36, other web-sites 38 and the user interact as follows:

The PC 30 may perform further processing of the received information prior to interacting with the database web-site 36.

The information, including the selected option, is then transmitted via the internet 34 to the database web-site 36.

The database web-site 36 then processes the received information in order to attempt to match it to a particular part of the electronic versions of the publications stored in the database or a particular advertisement. The search for a match is made firstly through the publications in which the user has registered an interest, but may also include other well known possibilities, or indeed all of the publications and advertisements stored by the publications database. For each match, the respective action information is extracted and is transmitted via the internet 34 to the user's PC. Alternatively, each match may be relayed to another web-site 38, for example of the publisher of the publication or the supplier of the advertised product, and this web-site may then send to the user's PC the respective action information.

Upon receipt of this information by the user's PC 30, it is presented to the user through the web browser application. If there is more than one match, the user can select one or more of them. The user can confirm or amend the selected option made at the time of capture. The browser can also inform the user of an error if the selected option at the time of capture is incompatible with the action information. (For example, if the user had captured a newspaper article and selected the "order" option, but if the action information for the electronic form of the newspaper article permitted merely "view", "re-print", "follow-up" and "similar", an error would be displayed.)

Once the user has confirmed their requirements, those requirements are sent via the internet 34 as an instruction to the appropriate web-sites 36,38 so that the user's requirements can be fulfilled, any required payment can be obtained, and any distribution of income can be performed.

In addition to performing the functions described above, the database web-site also builds up a profile of each user based on the information which the users have requested. For example, the profile may include details of particular types of product in which the user has shown an interest. Then, for example, when a new product is being launched, the manufacturer of the new product can request the proprietors of the database web-site 36 to advertise the product to any user who has shown an interest in that type of product over a prescribed time period. In particular, interest lists may be generated. These lists may then be used in two ways. First, the database web-site 36 aggregates enquiries together and then advertises to the 'trade' that it has a number of interested customers. The database web-site 36 does not disclose the identities of the interested customers and all advertisements are routed to the interested customers via the database web-site 36. Second, the database web-site 36 advises the existence of an interested customer to potential suppliers who may wish to advertise to them. Again, a potential supplier cannot contact the interested customer direct, and any advertisements are passed via the database web-site 36. Therefore, the system provides for highly directed advertising and qualified lists of customers.

It will be appreciated that many modifications and developments may be made to the embodiment of the invention described above. For example, as the available processing power and storage capacity of computer equipment increase, it may be possible to include at least some of the functionality of the database web-site 36 in the user's PC 30 or indeed in the image capture device 10.

In the embodiment described above, the printed document need not necessarily be specially adapted in order to enable matching to be carried out between the captured image information and the information stored by the database web-site 36. However, to facilitate identification, the printed document may include additional information, such as a set of identification characters printed in a special way, a bar-code or the like. Indeed, the identification characters could be an extended URL which points to the database web-site 36 and includes a unique identifier for the document in question. The unique identifier may have a check-sum so that a capture error can be identified at the time of capture, or indeed may be an error correcting code.

In the embodiment of the invention described above, a particular form of hand-held image capture device 10 is employed which can be used at any convenient time and place. It should be noted, however, that other forms of image capture device may be employed, such as hand scanners, text readers, bar-code readers and digital cameras. For a user who does not require portability, the functionality of the image capture device may instead be provided by a desktop scanner and the user's PC.

In the embodiment of the invention described above, the image capture device 10 has physical keys with which the user can select required options. User input can, however, be obtained in other ways, for example with a touch-sensitive screen or using voice recognition.

Figure 4:
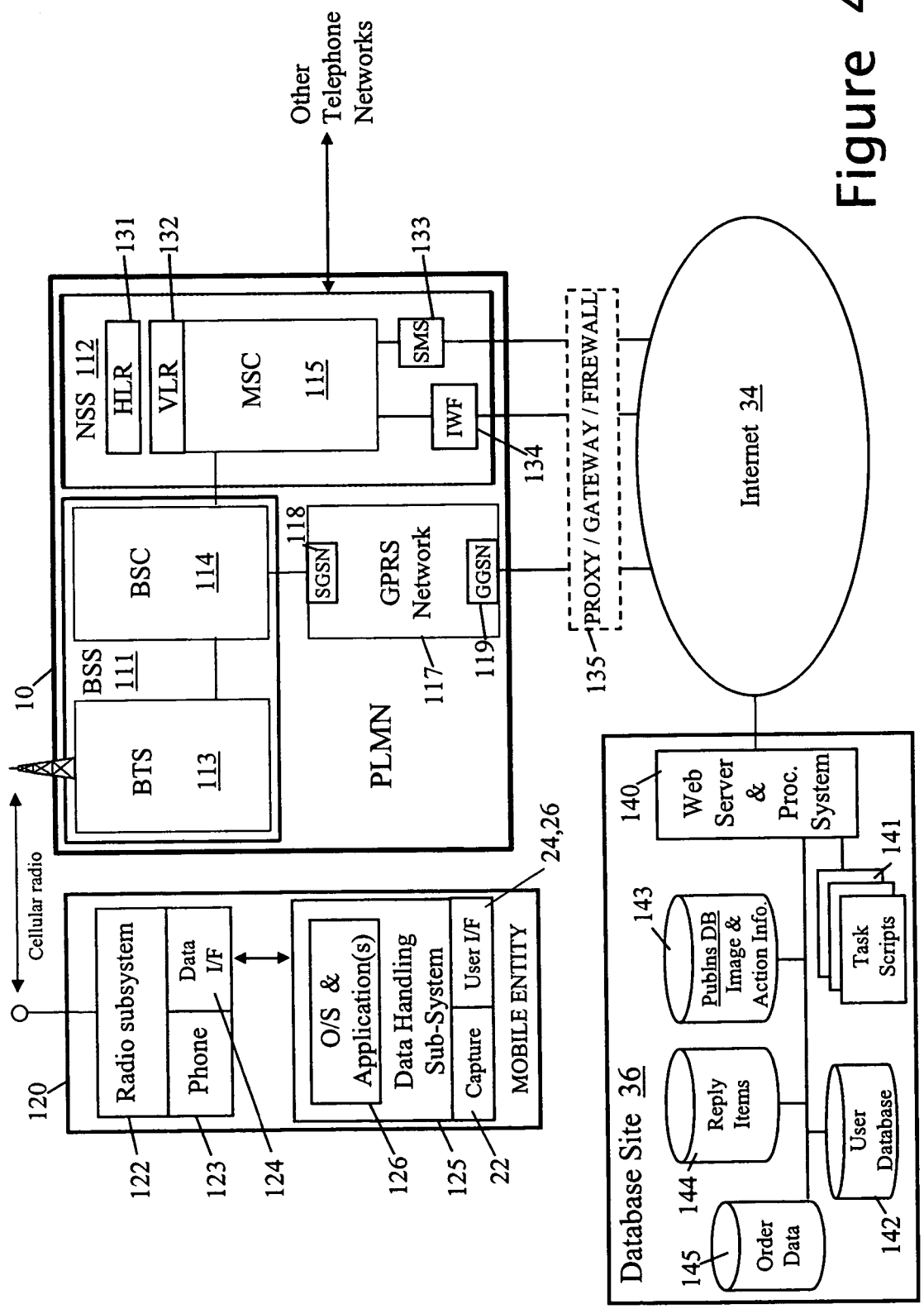
FIG. 4 is a diagram showing the image capture device incorporated into a mobile entity such as a cell phone.

In the embodiment of the invention described above, the image capture device 10 is docked with the user's PC 30 in order to download the captured information and selected option to the PC 30. In a modification, the image capture device 10 may be arranged to communicate with the database web-site 26 without the intermediary of a user's PC 30, for example using a mobile or conventional telephone network. By way of example, FIG. 4 illustrates a mobile entity 120 which has an integral image capture device and can communicate over a mobile communication infrastructure with the database internet site 36. In this example, the mobile entity 120 communicates, using radio subsystem 122 and a phone subsystem 123, with the fixed infrastructure of a GSM PLMN (Public Land Mobile Network) 110 to provide basic voice telephony services. In addition, the mobile entity 120 includes a data-handling subsystem 125 interworking, via data interface 124, with the radio subsystem 122 for the transmission and reception of data over a data-capable bearer service provided by the PLMN; the data-capable bearer service enables the mobile entity 120 to communicate with the site 36 via the public Internet 34. The data handling subsystem 125 supports an operating environment 126 in which applications run, the operating environment including an appropriate communications stack. The data handling subsystem provides the processing resources and other functionality to form an image capture device; in particular, the subsystem 125 includes an image sensor 22, option selection keys 24 and LCD display 26 as for the FIG. 2 device.

Considering the FIG. 4 arrangement in more detail, the fixed infrastructure 110 of the GSM PLMN comprises one or more Base Station Subsystems (BSS) 111 and a Network and Switching Subsystem NSS 112. Each BSS 111 comprises a Base Station Controller (BSC) 114 controlling multiple Base Transceiver Stations (BTS) 113 each associated with a respective "cell" of the radio network. When active, the radio subsystem 122 of the mobile entity 20 communicates via a radio link with the BTS 113 of the cell in which the mobile entity is currently located. As regards the NSS 112, this comprises one or more Mobile Switching Centers (MSC) 115 together with other elements such as Visitor Location Registers 132 and Home Location Register 132.

When the mobile entity 120 is used to make a normal telephone call, a traffic circuit for carrying digitised voice is set up through the relevant BSS 111 to the NSS 112 which is then responsible for routing the call to the target phone (whether in the same PLMN or in another network).

With respect to data transmission to/from the mobile entity 120, in the present example three different data-capable bearer services are depicted though other possibilities exist. A first data-capable bearer service is available in the form of a Circuit Switched Data (CSD) service; in this case a full traffic circuit is used for carrying data and the MSC 132 routes the circuit to an InterWorking Function IWF 134 the precise nature of which depends on what is connected to the other side of the IWF. Thus, IWF could be configured to provide direct access to the public Internet 34 (that is, provide functionality similar to an IAP—Internet Access Provider IAP). Alternatively, the IWF could simply be a modem connecting to a PSTN; in this case, Internet access can be achieved by connection across the PSTN to a standard IAP.

A second, low bandwidth, data-capable bearer service is available through use of the Short Message Service that passes data carried in signalling channel slots to an SMS unit which can be arranged to provide connectivity to the public Internet 34.

A third data-capable bearer service is provided in the form of GPRS (General Packet Radio Service which enables IP (or X.25) packet data to be passed from the data handling system of the mobile entity 120, via the data interface 124, radio subsystem 121 and relevant BSS 111, to a GPRS network 117 of the PLMN 110 (and vice versa). The GPRS network 117 includes a SGSN (Serving GPRS Support Node) 118 interfacing BSC 114 with the network 117, and a GGSN (Gateway GPRS Support Node) interfacing the network 117 with an external network (in this example, the public Internet 34). Full details of GPRS can be found in the ETSI (European Telecommunications Standards Institute) GSM 03.60 specification. Using GPRS, the mobile entity 120 can exchange packet data via the BSS 111 and GPRS network 117 with entities connected to the public Internet 34.

The data connection between the PLMN 110 and the Internet 34 will generally be through a firewall 135 with proxy and/or gateway functionality.

Different data-capable bearer services to those described above may be provided, the described services being simply examples of what is possible.

The above-described data-capable bearer services enable the data handling subsystem 125 (including the image capture device functionality) to access the database website 36 connected to the public Internet 34. In fact, data-capable bearer services could equally provide access to a database site 36 located within the domain of the PLMN operator or connected to another public or private data network.

The interaction between the image capture device functionality of the data handling subsystem 125 and the database site 36 can be implemented as a WAP client/service interaction—that is, the image-capture-device functionality can be arranged to behave as a WAP application WAP application running on top of a WAP stack where "WAP" is the Wireless Application Protocol standard. Details of WAP can be found, for example, in the book "Official Wireless Application Protocol" Wireless Application Protocol Forum, Ltd published 1999 Wiley Computer Publishing. In this case, the firewall 135 will generally also serve as a WAP proxy and gateway.

The mobile entity 120 may take many different forms. For example, it could be two separate units such as a mobile phone (providing elements 122–124) and a mobile PC with image capture sensor (data-handling system 125), coupled by an appropriate link (wireline, infrared or even short range radio system such as Bluetooth). Alternatively, mobile entity 120 could be a single unit. Of course, if only data transmission/reception is required (and not voice), the phone functionality 124 can be omitted.

As regards the database site 36, this is substantially of the form already described and comprises a main processing resource 140 providing both a web server and a system for processing requests from the mobile entity 120 by running appropriate task scripts 141 according to the nature of the request. In the course of this processing, reference is made to user database 142 holding data about users, and publications database 142 holding image and action database for the items expected to form the subject of user requests. A further database 144 holds reply items that may be appropriate to return to the requesting user in response to their request. Database 145 records transaction data for the cases where the user orders documents or other items.

Whilst the above description of a mobile entity equipped with an image-capture-device functionality has been given with reference to a PLMN based on GSM technology, it will be appreciated that many other cellular radio technologies exist and can typically provide the same type of functionality as described for the GSM PLMN 10. As an alternative to cellular radio, non-wired communication between the mobile entity and the fixed communications infrastructure to which the site 36 is connected, can be provided by a short-range wireless technology such as a Bluetooth radio system; in this case, a network of fixed short-range transceivers is preferably provided to enable mobility of the user around an area (such as shopping mall).

In the embodiments described above, the end result is achieved by electronic means, for example web pages are displayed on a PC, or orders are placed electronically. There are other possibilities. For example, the database web-site 36 might identify captured information, for which the "follow-up" option has been selected by the user, as relating to an enquiry form (for example because of its general layout and the inclusion of the words "Send me more details" or the like). Using OCR and other algorithms, the database web-site 36 would identify how the form should be completed, for example with the user's name and address. The database web-site 36 would then complete the enquiry form and, optionally after confirmation by the user, print it out, ready for mailing or faxing to the advertiser. As another example, the database web-site 36 might identify captured information, for which the "order" option has been selected by the user, as relating to an order form. Using OCR and other algorithms, the database web-site 36 would identify how the form should be completed, for example with the user's name, address and bank account details. The database web-site 36 would then complete the order form and, optionally after confirmation by the user, print it out, ready for mailing or faxing to the supplier. It should be noted that, in these two examples, the database web-site 36 does not need to have prior knowledge of the precise content of the forms. Instead, it has sufficient knowledge to be able to recognise them as an enquiry form and an order form respectively and to be able to complete them in an appropriate manner. It will be appreciated that these features may be provided in a system which does not have prior knowledge of the precise content of various documents, or in a system which attempts to match captured information with stored information, and which, if no match is found, then determines if the captured information appears to relate to a form, and if so attempts to complete the form.

One situation where a form-filling capability is of particular use is where a user is queuing for service by an attendant (for example, at a bank). During the queue-waiting period, the user can scan documents of interest including forms that are required to be completed and presented to the attendant. The required form after scanning in by th eimage capture device is sent to the database site where it is recognised and user details filled in. The form is then stored pending the arrival of the user at the head of the queue whereupon the form is electronically delivered to the attendant or printed at a local printer (this is triggered, for example, by the user giving their name to the attendant who inputs their name into a desktop machine connected to the database system, or by the user issuing an output command). A similar system can be used where form selection is done using less sophisticated means than the image capture device (for example, the input of a simple form number through a user interface keypad of a mobile entity such as illustrated in FIG. 4).

It should be noted that the embodiment of the invention has been described above purely by way of example and that many other modifications and developments may be made thereto within the scope of the present invention. For example, feedback provided to the user (either contemporaneously where the image capture device is incorporated in a mobile entity such as shown in FIG. 4, or at a later time when the image capture device must be downloaded through a PC as depicted in FIG. 3) is not restricted to static pages or images and can be in any suitable media type or types including streaming video and sound.

The invention claimed is:

1. A computer system for processing a paper document comprising:
   capturing means for capturing an image of a paper document to produce captured image information;
   selecting means for enabling a user to select one of a plurality of options for action to be taken in relation to that captured image information;
   a document database storing image information relating to a plurality of documents and for each document information relating to action which can be taken in relation to that document; and
   processing means
      for matching the captured image information with the stored image information in the document database for at least one of the documents,
      for determining the respective action information which can be taken in relation to the matched document, and
      for producing a computer instruction as to action to be taken, the produced instruction determined from the determined respective action information and from the user-selected option.

2. A system as claimed in claim 1, wherein:
   the captured image information includes information from which textual and/or graphical content of the captured document can be determined; and
   the processing means uses that textual and/or graphical content in the matching process.

3. A system as claimed in claim 1, wherein:
   the captured image information includes information from which font and/or layout and/or colour in the captured document can be determined; and
   the processing means uses that font and/or layout and/or colour in the matching process.

4. A system as claimed in claim 1, wherein:
   the captured image information includes information from which a property of the paper of the captured document can be determined; and
   the processing means uses that paper property in the matching process.

5. A system as claimed in claim 1, wherein:
   a user database is provided storing information about a plurality of users; and
   the processing means is operable to receive the stored information for the particular user and to use that information in producing the computer instruction.

6. A system as claimed in claim 5, wherein:
   the processing means is operable, in the case where the captured image information does not match the stored image information for any of the documents, to analyse the captured image information to determine whether it relates to a form, and, if so:
   to determine at least one position where user information should be added to the form to complete the form; and
   to add the user information for the particular user to the captured image information to provide an image of the form completed with the user information in the determined position(s).

7. A system as claimed in claim 1, further comprising means for storing the captured image information (and if applicable the user selected option) for subsequent supply to the processing means.

8. A system as claimed in claim 7, wherein the storing means is operable to store the captured image information (and if applicable the user selected option) relating to a plurality of images, for subsequent supply to the processing means.

9. A method of operation of a computer system comprising the steps of:
   capturing an image of a paper document to produce captured image information;
   noting a selection by a user of one of a plurality of options for action to be taken in relation to that captured image information;
   storing in a document database image information relating to a plurality of documents and for each document information relating to action which can be taken in relation to that document; and
   matching the captured image information with the stored image information in the database for at least one of the documents and determining the respective action information which can be taken in relation to the matched document; and
   producing a computer instruction as to action to be taken from the determined respective action information and from the user-selected option.

10. A method as claimed in claim 9, wherein:
    the captured image information includes information from which textual and/or graphical content of the captured document can be determined; and
    that textual and/or graphical content is used in the matching step.

11. A method as claimed in claim 9, wherein:
the captured image information includes information from which font and/or layout and/or colour in the captured document can be determined; and
that font and/or layout and/or colour is used in the matching step.

12. A method as claimed in claim 9, wherein:
the captured image information includes information from which a property of the paper of the captured document can be determined; and
that paper property is used in the matching process.

13. A method as claimed in claim 9, further including the steps of:
storing information about a plurality of users; and
using that information for the particular user in producing the computer instruction.

14. A method as claimed in claim 13, further including the steps, in the case where the captured image information does not match the stored image information for any of the documents, of analysing the captured image information to determine whether it relates to a form, and, if so:
determining at least one position where user information should be added to the form to complete the form; and
adding the user information for the particular user to the captured image information to provide an image of the form completed with the user information in the determined position(s).

15. A method as claimed in claim 9, further comprising the step of storing the captured image information (and if applicable the user selected option) for subsequent processing.

16. A method as claimed in claim 9, further comprising the step of storing the captured image information (and if applicable the user selected option) relating to a plurality of images, for subsequent supply to the processing means.

* * * * *